US011953997B2

(12) United States Patent
Kommera et al.

(10) Patent No.: US 11,953,997 B2
(45) Date of Patent: Apr. 9, 2024

(54) SYSTEMS AND METHODS FOR CROSS-REGIONAL BACK UP OF DISTRIBUTED DATABASES ON A CLOUD SERVICE

(71) Applicant: Capital One Services, LLC, McLean, VA (US)

(72) Inventors: Raveender Kommera, Flower Mound, TX (US); Nathan Gloier, Frisco, TX (US); Raman Gupta, Plano, TX (US)

(73) Assignee: Capital One Services, LLC, McLean, VA (US)

(*) Notice: Subject to any disclaimer, the term of this patent is extended or adjusted under 35 U.S.C. 154(b) by 545 days.

(21) Appl. No.: 16/239,586

(22) Filed: Jan. 4, 2019

(65) Prior Publication Data

US 2020/0125453 A1    Apr. 23, 2020

Related U.S. Application Data

(63) Continuation of application No. 16/168,784, filed on Oct. 23, 2018, now Pat. No. 10,963,353.

(51) Int. Cl.
  *G06F 11/14*    (2006.01)
  *G06F 16/27*    (2019.01)
  *G06F 21/44*    (2013.01)

(52) U.S. Cl.
  CPC ...... *G06F 11/1464* (2013.01); *G06F 11/1451* (2013.01); *G06F 11/1469* (2013.01); *G06F 16/27* (2019.01); *G06F 21/44* (2013.01)

(58) Field of Classification Search
  CPC .. G06F 16/27; G06F 11/1451; G06F 11/1469; G06F 11/1464; G06F 21/44
  See application file for complete search history.

(56) References Cited

U.S. PATENT DOCUMENTS 5,408,649 A * 4/1995 Beshears ............. G06F 11/2736
  714/10
5,621,884 A * 4/1997 Beshears ............. G06F 11/2041
  714/10

(Continued)

OTHER PUBLICATIONS

Abdullah et al., "The Mapping Process of Unstructured Data to Structured Data", Universiti Kebangsaan Malaysia (UKM) (Year: 2013).*

*Primary Examiner* — Irete F Ehichioya
*Assistant Examiner* — Huen Wong
(74) *Attorney, Agent, or Firm* — Perkins Coie LLP (57) ABSTRACT

The present disclosure relates to systems and methods for backing up a distributed database provided as a database instance across servers within a first geographic region. In one example, such a system may include at least one processor configured to: generate and transmit a command to duplicate the distributed database in object databases on first region servers; generate and transmit a command to duplicate the object databases on servers in at least a second geographic region independent from servers in the first region; and, when an error is detected with at least one server within the first region: generate and transmit a command to initiate a new distributed database on second region servers, generate and transmit a command to populate the new distributed database using the object databases on second region servers, and generate and transmit a command to re-route traffic from the distributed database to the new distributed database.

18 Claims, 5 Drawing Sheets

(56) References Cited

U.S. PATENT DOCUMENTS

| | | | |
|---|---|---|---|
| 6,035,412 A | 3/2000 | Tamer et al. | |
| 6,199,069 B1* | 3/2001 | Dettinger | G06F 11/1482 |
| 6,353,878 B1 | 3/2002 | Dunham | |
| 6,728,713 B1* | 4/2004 | Beach | H04N 21/23109 |
| | | | 348/E5.103 |
| 6,732,111 B2* | 5/2004 | Brodersen | G06F 16/178 |
| 6,880,052 B2* | 4/2005 | Lubbers | G06F 11/2058 |
| | | | 711/6 |
| 6,983,295 B1 | 1/2006 | Hart | |
| 7,032,131 B2* | 4/2006 | Lubbers | G06F 11/2079 |
| | | | 714/13 |
| 7,103,619 B1 | 9/2006 | Rajpurkar et al. | |
| 7,146,356 B2* | 12/2006 | Choi | G06F 16/24522 |
| | | | 707/811 |
| 7,185,235 B2* | 2/2007 | Radestock | G06F 11/3688 |
| | | | 714/4.4 |
| 7,266,702 B2* | 9/2007 | Hotti | G06F 21/6227 |
| | | | 707/999.009 |
| 7,529,785 B1* | 5/2009 | Spertus | G06F 11/1453 |
| 7,599,952 B2* | 10/2009 | Parkinson | G06F 40/216 |
| | | | 707/999.102 |
| 7,657,581 B2* | 2/2010 | Orenstein | G06F 16/27 |
| | | | 709/203 |
| 7,743,276 B2* | 6/2010 | Jacobson | G06F 11/1662 |
| | | | 714/6.32 |
| 7,801,994 B2* | 9/2010 | Kudo | G06F 9/5044 |
| | | | 718/1 |
| 7,831,553 B2* | 11/2010 | Prahlad | G06F 16/1727 |
| | | | 707/694 |
| 7,849,049 B2* | 12/2010 | Langseth | G06F 16/254 |
| | | | 707/602 |
| 7,930,314 B2* | 4/2011 | Gupta | G06F 16/242 |
| | | | 707/999.005 |
| 8,818,949 B2* | 8/2014 | Cline | G06F 16/214 |
| | | | 707/638 |
| 8,838,539 B1* | 9/2014 | Ashcraft | G06F 12/0806 |
| | | | 707/637 |
| 9,208,032 B1* | 12/2015 | McAlister | G06F 11/1471 |
| 9,299,041 B2* | 3/2016 | Tsumura | G06Q 10/06 |
| 10,025,673 B1* | 7/2018 | Maccanti | G06F 11/1451 |
| 10,187,457 B1* | 1/2019 | Reynolds | G06F 11/073 |
| 10,521,311 B1* | 12/2019 | Greenwood | G06F 11/2048 |
| 10,545,667 B1* | 1/2020 | Magerramov | G06F 3/0607 |
| 10,735,530 B1* | 8/2020 | Burnett | H04L 67/22 |
| 11,544,288 B2* | 1/2023 | Horowitz | G06F 16/273 |
| 2004/0148308 A1* | 7/2004 | Rajan | G06F 16/284 |
| 2004/0193658 A1* | 9/2004 | Kawamura | G06F 11/2074 |
| 2005/0120095 A1* | 6/2005 | Aman | H04L 67/1008 |
| | | | 709/219 |
| 2005/0158767 A1* | 7/2005 | Haskell | G16B 50/30 |
| | | | 435/6.11 |
| 2005/0203851 A1* | 9/2005 | King | H04L 67/1082 |
| | | | 705/51 |
| 2006/0149706 A1* | 7/2006 | Prang | G06F 16/284 |
| 2006/0253678 A1* | 11/2006 | Gusler | G06F 3/0605 |
| | | | 711/170 |
| 2007/0061444 A1* | 3/2007 | Venkatesan | G06F 16/27 |
| | | | 709/224 |
| 2010/0121893 A1* | 5/2010 | Uhrhane | G06F 21/53 |
| | | | 707/822 |
| 2011/0161333 A1* | 6/2011 | Langseth | G06F 16/254 |
| | | | 707/755 |
| 2011/0196827 A1* | 8/2011 | Zunger | G06F 16/27 |
| | | | 707/622 |
| 2011/0258333 A1* | 10/2011 | Pomerantz | H04L 63/08 |
| | | | 709/229 |
| 2011/0302189 A1* | 12/2011 | Liu | G06F 16/835 |
| | | | 707/769 |
| 2012/0089781 A1* | 4/2012 | Ranade | G06F 16/1744 |
| | | | 711/118 |
| 2012/0310765 A1* | 12/2012 | Masters | G06F 9/5088 |
| | | | 705/26.3 |
| 2013/0054642 A1* | 2/2013 | Morin | G06F 16/25 |
| | | | 707/770 |
| 2013/0104251 A1* | 4/2013 | Moore | G06F 21/602 |
| | | | 726/30 |
| 2013/0110778 A1* | 5/2013 | Taylor | G06F 11/1435 |
| | | | 707/624 |
| 2013/0173546 A1* | 7/2013 | Cline | G06F 16/27 |
| | | | 707/638 |
| 2013/0318084 A1* | 11/2013 | Dalal | H04L 63/0281 |
| | | | 707/736 |
| 2014/0101100 A1* | 4/2014 | Hu | H04L 67/1002 |
| | | | 707/617 |
| 2014/0188794 A1* | 7/2014 | Dalton | G06F 16/275 |
| | | | 707/611 |
| 2014/0269331 A1* | 9/2014 | Pfeifer | H04L 45/121 |
| | | | 370/238 |
| 2015/0074409 A1* | 3/2015 | Reid | G06F 21/6218 |
| | | | 713/171 |
| 2015/0370917 A1* | 12/2015 | Vandiver | G06F 16/835 |
| | | | 707/756 |
| 2016/0021172 A1* | 1/2016 | Mahadevan | H04L 67/327 |
| | | | 709/204 |
| 2016/0162382 A1* | 6/2016 | Devin | G06F 11/3082 |
| | | | 702/186 |
| 2016/0352836 A1* | 12/2016 | Kamalakantha | G06F 16/214 |
| 2016/0356615 A1* | 12/2016 | Arata | G06Q 50/30 |
| 2017/0192861 A1* | 7/2017 | Vijayan | G06F 3/0619 |
| 2017/0344618 A1* | 11/2017 | Horowitz | G06F 11/1471 |
| 2018/0276580 A1* | 9/2018 | Gurevich | G06Q 10/0631 |
| 2019/0095471 A1* | 3/2019 | Liu | G06F 16/25 |
| 2019/0155937 A1* | 5/2019 | Barve | G06F 16/2365 |
| 2019/0163579 A1* | 5/2019 | Pothoff | G06F 16/2365 |
| 2019/0179948 A1* | 6/2019 | Benjamin-Deckert | |
| | | | G06F 16/81 |
| 2019/0205429 A1* | 7/2019 | Lee | G06F 16/119 |
| 2019/0340167 A1* | 11/2019 | Raman | G06F 16/252 |
| 2019/0342390 A1* | 11/2019 | Iancu | H04L 67/1051 |
| 2020/0004847 A1* | 1/2020 | Bagga | G06F 16/211 |
| 2021/0173714 A1* | 6/2021 | Huang | G06F 16/182 |

* cited by examiner

SYSTEMS AND METHODS FOR CROSS-REGIONAL BACK UP OF DISTRIBUTED DATABASES ON A CLOUD SERVICE

CROSS-REFERENCE TO RELATED APPLICATION

This application is a continuation of U.S. application Ser. No. 16/168,784, filed Oct. 23, 2018, the contents of which are incorporated herein by reference in their entirety.

TECHNICAL FIELD

The present disclosure relates generally to the field of virtual distributed database management. More specifically, and without limitation, this disclosure relates to systems and methods for backing up distributed databases provided as database instances within geographical regions of a cloud service.

BACKGROUND

Many cloud services provide distributed databases on remote servers for use by subscribers to the cloud services. For example, Amazon Web Services (AWS) provides the Relational Database Service (RDS) to subscribers. The distributed database is generally an instance of a database implemented on remote servers and accessible via a terminal of a subscriber. The distributed database generally includes entries stored by one or more nodes in a network of nodes, the full database being provided by the network of nodes.

Many cloud services also provide object storage for use by subscribers. For example, Amazon Web Services (AWS) provides Simple Storage Service (S3) for subscribers. Object storage provides for retention of unstructured data such that each object includes data, metadata, and at least one identifier and is independent of the other objects.

In some implementations, the distributed database and/or the object storage may be provided in particular geographic regions. For example, Amazon's RDS is provided in various Availability Zones, such that the remote servers implementing the database instance are clustered in a particular geographic region. Similarly, Amazon's S3 is provided in the Availability Zones, such that remote servers providing the object storage are clustered in a particular geographic region. This clustering may increase access speeds because entries in the database and objects in the storage are not distributed across the globe. However, the database and the object storage are not backed-up cross-regionally. Accordingly, a severe disaster affecting an entire geographic area may result in loss of databases and objects.

SUMMARY

In view of the foregoing, embodiments of the present disclosure describe systems and methods for backing up a distributed database stored across a plurality of servers within a first geographic region.

The provided systems allow for backing up of database instances across regions without engaging in costly duplication of the entire database. Accordingly, the systems provided herein may provide for faster cross-regional backing up of distributed databases.

Embodiments of the present disclosure may use object storages to implement the above-noted technical improvements. In particular, systems may use object storages to back up a distributed database in a first region but await structuring of the object storages until an error occurs in the first region.

In one embodiment, the present disclosure describes a system for backing up a distributed database, the distributed database being stored across a plurality of servers within a first geographic region. The system may comprise at least one memory storing instructions and at least one processor configured to execute the instructions to perform one or more operations. The operations may comprise generating a first command to duplicate the distributed database in one or more object databases on the servers in the first geographic region, and transmitting the first command to the servers in the first geographic region; and, after the distributed database is duplicated, generating a second command to duplicate the one or more object databases on a plurality of servers in at least a second geographic region, the plurality of servers in the second geographic region being independent from the plurality of servers in the first geographic region, and transmitting the second command to the servers in the second geographic region. When an error is detected with at least one server within the first geographic region, the operations may further comprise generating a third command to initiate a new distributed database on the plurality of servers in the second geographic region and transmitting the third command to the servers in the second geographic region; generating a fourth command to populate the new distributed database using the one or more object databases on the plurality of servers in the second geographic region and transmitting the fourth command to the servers in the second geographic region; and generating a fifth command to re-route traffic from the distributed database to the new distributed database and transmitting the fifth command to at least one of the servers in the first geographic region and the servers in the second geographic region.

In one embodiment, the present disclosure describes a system for backing up a distributed database, the distributed database being stored across a plurality of servers within a first geographic region. The system may comprise at least one memory storing instructions and at least one processor configured to execute the instructions to perform one or more operations. The operations may comprise generating a first command to duplicate the distributed database in one or more object databases on the servers in the first geographic region, and transmitting the first command to the servers in the first geographic region; after the distributed database is duplicated, generating a second command to duplicate the one or more object databases on a plurality of servers in at least a second geographic region, the plurality of servers in the second geographic region being independent from the plurality of servers in the first geographic region, and transmitting the second command to the servers in the second geographic region; and generating a script for executing upon a detected error associated with the distributed database and transmitting the script to at least one of the servers in the first geographic region and the servers in the second geographic region. The script may be configured to cause the servers to: initiate a new distributed database on the plurality of servers in the second geographic region, populate the new distributed database using the one or more object databases on the plurality of servers in the second geographic region, and re-route traffic from the distributed database to the new distributed database.

In one embodiment, the present disclosure describes a system for backing up a distributed database, the distributed database being provided as a database instance across a plurality of servers within a first geographic region. The system may comprise at least one memory storing instructions and at least one processor configured to execute the instructions to perform one or more operations. The operations may comprise generating a first command to duplicate the distributed database as one or more object databases stored on the servers in the first geographic region, and transmitting the first command to a cloud service including the plurality of servers within the first geographic region; and, after the distributed database is duplicated, generating a second command to copy the one or more object databases from the plurality of servers within the first geographic region to a plurality of servers in at least a second geographic region, the plurality of servers in the second geographic region being independent from the plurality of servers in the first geographic region, and transmitting the second command to the cloud service. The operations may further comprise, in response to receiving an error message from at least one server within the first geographic region, the error message indicating that the distributed database instance is no longer functional: generating a third command to provide a new distributed database as a new database instance across the plurality of servers in the second geographic region, and transmitting the third command to the cloud service, generating a fourth command to populate the new distributed database using the one or more object databases stored on the plurality of servers in the second geographic region, and transmitting the fourth command to the cloud service, and generating a fifth command to modify a weighted routing policy such that traffic to the database instance is directed to the new database instance, and transmitting the fifth command to the cloud service.

In one embodiment, the present disclosure describes a cloud service hosting a distributed database, the distributed database being stored across a plurality of servers of the cloud service within a first geographic region. The cloud service may comprise at least one memory storing instructions and at least one processor configured to execute the instructions to perform one or more operations. The operations may comprise duplicating the distributed database in one or more object databases on the servers in the first geographic region; and, after the distributed database is duplicated, duplicating the one or more object databases on a plurality of servers in at least a second geographic region, the plurality of servers in the second geographic region being independent from the plurality of servers in the first geographic region. When an error is detected with at least one server within the first geographic region, the operations may further comprise initiating a new distributed database on the plurality of servers in the second geographic region, populating the new distributed database using the one or more object databases on the plurality of servers in the second geographic region, and re-routing traffic from the distributed database to the new distributed database.

In one embodiment, the present disclosure describes a remote server included in a plurality of servers within a first geographic region providing an instance of a distributed database executed as an instance. The server may comprise at least one memory storing instructions and at least one processor configured to execute the instructions to perform one or more operations. The operations may comprise duplicating the distributed database in one or more object databases on the servers in the first geographic region; after the distributed database is duplicated, duplicating the one or more object databases on a plurality of servers in at least a second geographic region, the plurality of servers in the second geographic region being independent from the plurality of servers in the first geographic region, and transmitting the second command to the servers in the second geographic region; and generating a script for executing upon a detected error associated with the distributed database and transmitting the script to at least one server of the servers in the second geographic region. The script may be configured to cause the servers in the second geographic region to: initiate a new distributed database on the plurality of servers in the second geographic region, populate the new distributed database using the one or more object databases on the plurality of servers in the second geographic region, and re-route traffic from the distributed database to the new distributed database.

In one embodiment, the present disclosure describes a cloud service providing a distributed database, the distributed database being stored across a plurality of servers of the cloud service within a first geographic region. The cloud service may comprise at least one memory storing instructions and at least one processor configured to execute the instructions to perform one or more operations. The operations may comprise receiving a first command from the terminal to duplicate the distributed database as one or more object databases stored on the servers in the first geographic region and duplicating the distributed database in response to the first command; receiving a second command from the terminal to copy the one or more object databases from the plurality of servers within the first geographic region to a plurality of servers in at least a second geographic region and, after the distributed database is duplicated, copying the one or more object databases in response to the second command, wherein the plurality of servers in the second geographic region are independent from the plurality of servers in the first geographic region. The operations may further comprise, in response to receiving an error message from at least one server within the first geographic region, the error message indicating that the distributed database instance is no longer functional: receiving a third command from the terminal to provide a new distributed database as a new database instance across the plurality of servers in the second geographic region and providing the new distributed database in response to the third command, receiving a fourth command from the terminal to populate the new distributed database using the one or more object databases stored on the plurality of servers in the second geographic region and populating the new distributed database in response to the fourth command, and receiving a fifth command to modify a weighted routing policy such that traffic to the database instance is directed to the new database instance and modifying the weighted routing policy in response to the fifth command.

In some embodiments, the present disclose describes non-transitory, computer-readable media for causing one or more processors to execute methods consistent with the present disclosure.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

The disclosed embodiments relate to systems and methods for backing up a distributed database on a cloud service that provide the distributed database within a geographical region. Embodiments of the present disclosure may be implemented using a general-purpose computer. Alternatively, a special-purpose computer may be built according to embodiments of the present disclosure using suitable logic elements.

Advantageously, disclosed embodiments may solve the technical problem of backing up a distributed database across geographical regions of a cloud service. Moreover, disclosed embodiments may provide for cross-regional back-ups that use fewer resources and are faster than conventional back-ups within a region. Finally, disclosed embodiments may solve the technical problem of automating the previously manual process of re-building distributed databases after a crash or other error.

According to an aspect of the present disclosure, a user terminal may generate and transmit commands to perform the back-up. The user terminal may comprise a desktop, a laptop, or other computing device having at least one processor. For example, to back-up a distributed database provided on a cloud service, at least one processor may generate a first command to duplicate the distributed database in one or more object databases stored on servers in a first geographic region. The first command (and any other commands described below) may comprise an application programming interface (API) call.

As explained further below with respect to FIG. 2, the distributed database may be provided as database instances distributed across one or more remote servers in the first geographic region. For example, the instance may comprise an instance of an application, such as a MySQL instance, an Oracle Database instance, a Microsoft SQL Service instance, MariaDB instance, or the like, executed on the servers of the first geographic region. Accordingly, the distributed database may comprise a relational database or any other structured database.

The at least one processor may transmit the first command to the servers in the first geographic region. For example, the at least one processor may transmit the first command at least one communications interface, such as a network interface controller (NIC). The at least one processor may send the first command over one or more computer networks, such as the Internet, a local area network (LAN), or the like, and using WiFi, 4G, Ethernet, or the like. In some embodiments, to retain security, the at least one processor may send the first command over a private network (such as a LAN or the like) and/or may encrypt the first command (e.g., using an Advanced Encryption Standard (AES) or the like).

After the distributed database is duplicated, the at least one processor may generate a second command to duplicate the one or more object databases on a plurality of servers in at least a second geographic region. The plurality of servers in the second geographic region may be independent from the plurality of servers in the first geographic region. For example, the memories, processors, and other hardware components of the servers in the second geographic region may be in different servers and different server clusters than the servers in the first geographic region. Additionally, the servers in the second geographic region may not routinely access the servers in the first geographic region. For example, the servers in the second geographic region may communicate with the servers in the first geographic region only upon manual request by one or more users rather than through any automated mechanisms. Additionally or alternatively, the servers in the second geographic region may communicate, on average, with the servers in the first geographic region less frequently than the servers within each region communicate with each other.

As explained further below with respect to FIG. 2, the object databases may be provided as one or more storage areas (also referred to as "buckets") each holding unstructured data as objects and stored on the one or more remote servers in the first geographic region. For example, each area may have an associated identifier and associated with a subscriber to the cloud service. Similarly, each object may have an associated identifier within its corresponding area. Accordingly, the object databases may comprise unstructured databases having an object-storage architecture. In some embodiments, the one or more object databases may comprise seed hosts for a torrent, the torrent comprising duplicated data from the distributed database.

The at least one processor may transmit the second command to the servers in the second geographic region. For example, as explained above, the at least one processor may transmit the second command via at least one communications interface, such as an NIC.

The at least one processor may detect an error with at least one server within the first geographic region. The error may indicate that the distributed database is no longer functional. For example, the at least one processor may receive a message indicating that the at least one server has crashed or is otherwise inoperable and/or inaccessible. Additionally or alternatively, the at least one processor may periodically attempt to access the distributed database and detect the error when the distributed database is no longer accessible.

When an error is detected with at least one server within the first geographic region, the at least one processor may further generate a third command to initiate a new distributed database on the plurality of servers in the second geographic region. For example, the new distributed database may be built as a new database instance on the one or more remote servers in the second geographic region. Accordingly, the new database instance, like the original database instance, may comprise an instance of the application, such as a MySQL instance, an Oracle Database instance, a Microsoft SQL Service instance, MariaDB instance, or the like, executed on the servers of the second geographic region.

The at least one processor may transmit the third command to the servers in the second geographic region. For example, as explained above, the at least one processor may transmit the third command via at least one communications interface, such as an NIC.

The at least one processor may further generate fourth command to populate the new distributed database using the one or more object databases on the plurality of servers in the second geographic region. For example, the fourth command may include, identify a file including, or identify an object in the one or more object databases including a mapping from the unstructured objects of the one or more object database to a structure format corresponding to the structure of the original distributed database. Accordingly, the mapping may be used to construct the new distributed database from the unstructured objects in the one or more object databases.

The at least one processor may transmit the fourth command to the servers in the second geographic region. For example, as explained above, the at least one processor may transmit the fourth command via at least one communications interface, such as an NIC.

The at least one processor may further generate a fifth command to re-route traffic from the distributed database to the new distributed database. For example, the fifth command may modify a weighted routing policy such that traffic to the database instance is directed to the new database instance. Thus, in some embodiments, re-routing may comprise assigning a lesser weight in a weighted routing scheme to the servers in the first geographic region and a greater weight to the servers in the second geographic region. For example, assigning the lesser weight may comprise assigning a weight of zero. Additionally or alternatively, assigning the greater weight may comprise assigning a plurality of weights of a second weighted routing scheme to the servers in the second geographic region where the weights sum to one.

The at least one processor may transmit the fifth command to at least one of the servers in the first geographic region and the servers in the second geographic region. For example, as explained above, the at least one processor may transmit the fifth command via at least one communications interface, such as an NIC.

Alternatively to the third, fourth, and fifth commands described above, the at least one processor may generate a script for executing upon a detected error associated with the distributed database. In some embodiments, the script may comprise at least one of a C shell script, a bash script, a Perl script, a Python script, and a Ruby script. The at least one processor may transmit the script to at least one of the servers in the first geographic region and the servers in the second geographic region. For example, similar to the commands described above, the at least one processor may transmit the script via at least one communications interface, such as an NIC.

Accordingly, at least one of the servers in the first geographic region and the servers in the second geographic region may execute the script when the server(s) detect(s) an error within the first geographic region. The error may indicate that the distributed database is no longer functional. For example, at least one of the servers in the first geographic region and the servers in the second geographic region may receive a message indicating that at least one server in the first geographic region has crashed or is otherwise inoperable and/or inaccessible. Additionally or alternatively at least one of the servers in the first geographic region and the servers in the second geographic region may periodically test or otherwise access the distributed database and detect the error when the distributed database is no longer accessible.

Similar to the third, fourth, and fifth commands above, the script may cause the server(s) receiving the script to initiate a new distributed database on the plurality of servers in the second geographic region, populate the new distributed database using the one or more object databases on the plurality of servers in the second geographic region, and re-route traffic from the distributed database to the new distributed database.

In some embodiments, the cloud service may implement one or more security protocols. Accordingly, the user terminal may transmit credentials to at least one server within a first geographic region to authenticate itself. For example, the user terminal may transmit the credentials before transmitting any of the commands (and/or script) described above.

Alternatively, the user terminal may receive a request for credentials from the servers in the first geographic region, and, in response to the request, transmit credentials to the servers in the first geographic region to authenticate the system. For example, the user terminal may receive the request in response to a transmittal of the first command or other attempt to open a connection between the user terminal and the servers in the first geographic region.

In any of the embodiments described above, the credentials may comprise at least one of a username and a password or may comprise an authentication key obtained by the at least one processor. For example, the user terminal may transmit the credentials to the cloud service, or the cloud service may obtain the credentials from a key distribution center or other centralized credentialing service at the request of the user terminal.

According to another aspect of the present disclosure, a cloud service may host the distributed database and perform the back-up. The cloud service may comprise one or more remote servers or any other computing device providing a distributed database to one or more customers. For example, the cloud service may include a plurality of servers within a first geographic region storing the distributed database. The cloud service may duplicate the distributed database in one or more object databases on the servers in the first geographic region (e.g., as described above).

In some embodiments, the distributed database may be provided as database instances distributed across one or more remote servers in the first geographic region. As explained above and further below with respect to FIG. 2, the instance may comprise an instance of an application, such as a MySQL instance, an Oracle Database instance, a Microsoft SQL Service instance, MariaDB instance, or the like, executed on the servers of the first geographic region. Accordingly, the distributed database may comprise a relational database or any other structured database.

After the distributed database is duplicated, the cloud service may duplicate the one or more object databases on a plurality of servers in at least a second geographic region (e.g., as explained above). The plurality of servers in the second geographic region may be independent from the plurality of servers in the first geographic region, as explained above.

When an error is detected with at least one server within the first geographic region, the at least one processor may further initiate a new distributed database on the plurality of servers in the second geographic region (e.g., as explained above). For example, the new distributed database may be built as a new database instance on the one or more remote servers in the second geographic region. Accordingly, the new database instance, like the original database instance, may comprise an instance of the application, such as a MySQL instance, an Oracle Database instance, a Microsoft SQL Service instance, MariaDB instance, or the like, executed on the servers of the second geographic region.

The cloud service may further populate the new distributed database using the one or more object databases on the plurality of servers in the second geographic region. For example, the cloud service may access a mapping (e.g., included in a command from a user terminal, included in a file identified by the cloud service, included in an object identified in the one or more object databases by the cloud service, or the like) and use the mapping to transfer the unstructured objects of the one or more object database to a structure format corresponding to the structure of the original distributed database.

The cloud service may further re-route traffic from the distributed database to the new database. For example, the cloud service may modify a weighted routing policy such that traffic to the database instance is directed to the new database instance (e.g., as explained above).

Alternatively to the initiating, populating, and re-routing described above, the cloud service may generate a script for executing upon a detected error associated with the distributed database. In some embodiments, the script may comprise at least one of a C shell script, a bash script, a Perl script, a Python script, and a Ruby script. A remote server included in a plurality of servers within the first geographic region may transmit the script to at least one server of the servers in the second geographic region.

Accordingly, the servers in the first geographic region and/or the servers in the second geographic region may execute the script when the server(s) detect(s) an error within the first geographic region. The error may indicate that the distributed database is no longer functional (e.g., as explained above).

Similar to the initiating, populating, and re-routing described above, the script may cause the server(s) executing the script to initiate a new distributed database on the plurality of servers in the second geographic region, populate the new distributed database using the one or more object databases on the plurality of servers in the second geographic region, and re-route traffic from the distributed database to the new distributed database.

In some embodiments, the cloud service may implement one or more security protocols. Accordingly, the cloud service may receive credentials from a terminal requesting the update to authenticate the terminal. For example, the cloud service may authenticate the terminal before performing any of the steps described above.

Alternatively, the cloud service may transmit a request for credentials to a terminal requesting a backup; in response to the request, receive credentials from the terminal; and authenticate the terminal using the received credentials. For example, the cloud service may transmit the request in response to receiving a command from the terminal or other attempt to open a connection between the terminal and the one or more remote servers in the first geographic region.

In any of the embodiments described above, the credentials may comprise at least one of a username and a password or may comprise an authentication key obtained by the terminal. For example, the terminal may transmit the credentials to the cloud service, or the cloud service may obtain the credentials from a key distribution center or other centralized credentialing service at the request of the terminal.

Figure 1:
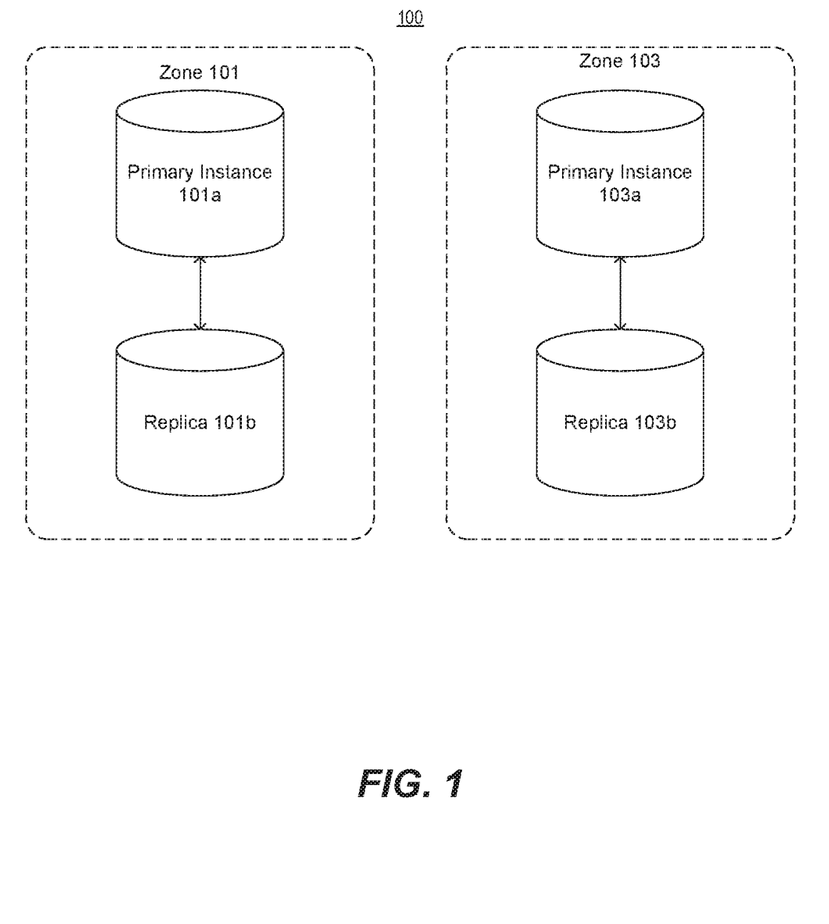
FIG. 1 is a block diagram of a system for backing up a regional distributed database.

FIG. 1 depicts a block diagram of a system 100 for backing up a regional distributed database. As depicted in FIG. 1, system 100 may comprise a plurality of zones, e.g., zones 101 and 103. A zone may comprise one or more remote servers implementing a distributed database (e.g., primary instance 101*a* and 103*a*). A remote server may comprise at least one memory storing at least a portion of the distributed database, at least one processor managing at least a portion of the distributed database, and at least one network interface controller for receiving requests and transmitting records in response to requests. In some embodiments, the at least one processor of a remote server may also determine whether to respond to received requests and/or to forward received requests to one or more other remote servers implementing the distributed database in the same zone.

As further depicted in FIG. 1, system 100 may provide for backing up distributed databases in the zones. For example, primary instance 101*a* is duplicated as replica 101*b* within zone 101, and primary instance 103*a* is duplicated as replica 103*b* within zone 103. The replica instances may be implemented on different remote servers within the zones or on at least some of the same remote servers as the primary instance within the zones. However, the replica instances still require resource-intense duplication of the structure of the primary instances and are still limited to the same zones as the primary instances.

Figure 2:
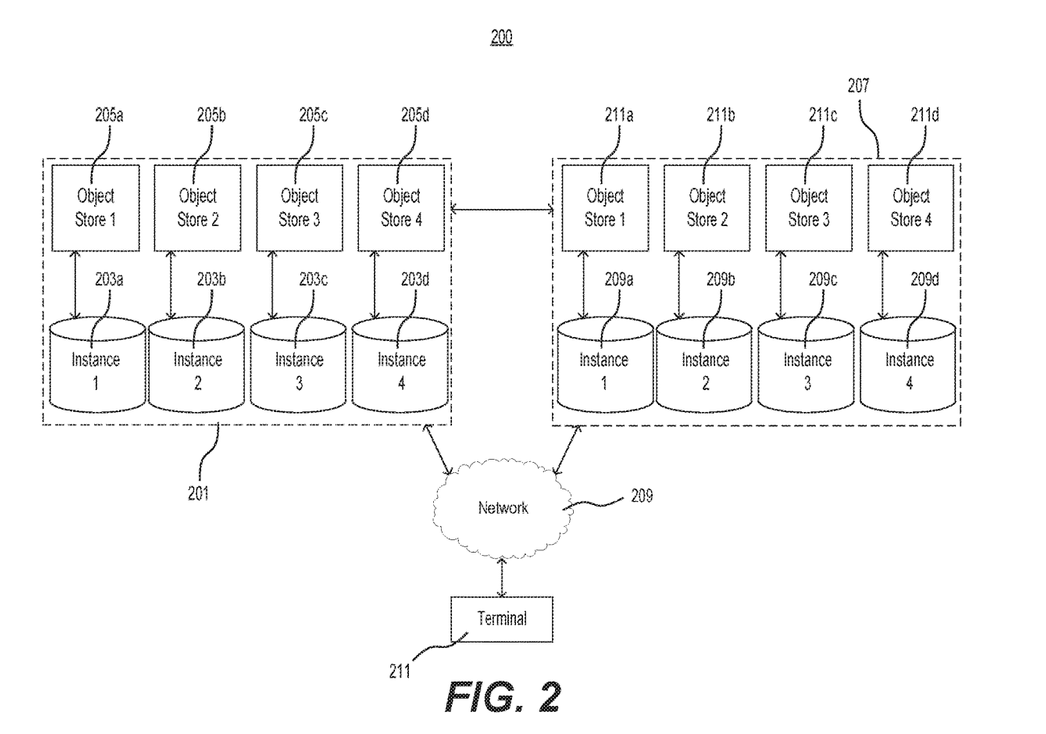
FIG. 2 is a block diagram of a cloud service providing regional distributed databases and regional object storages, according to an example embodiment of the present disclosure.

FIG. 2 depicts a block diagram of a cloud service 200 providing regional distributed databases and regional object storages. For example, cloud service 200 may provide a zone 201 for a plurality of distributed database instances (e.g., instances 203*a*, 203*b*, 203*c*, and 203*d*) and a plurality of object storages (e.g., stores 205*a*, 205*b*, 205*c*, and 205*d*). Similarly, cloud service 200 may provide a zone 207 for a plurality of distributed database instances (e.g., instances 209*a*, 209*b*, 209*c*, and 209*d*) and a plurality of object storages (e.g., stores 211*a*, 211*b*, 211*c*, and 211*d*). A zone may comprise a plurality of servers or any other collection of processors and memories configured to provide the plurality of distributed database instances and the plurality of object storages. Although depicted with two zones, cloud service 200 may be divided across any number of geographic regions (referred to as "zones").

Cloud service 200 may be accessible over one or more computer networks, such as network 209. For example, network 209 may comprise a LAN, the Internet, or other network. A terminal 211 may use network 209 to access cloud service 200. For example, terminal 211 may be associated with a user of cloud service 200 and may comprise a desktop, a laptop, or other computing device that the user may use to send commands to cloud service 200 and utilize services provided by cloud service 200.

In some embodiments, a zone may also include permissions. For example, a zone may include permissions indicating which users of cloud service 200 are permitted to initiate the instance, access the instance, terminate the instance, utilize certain applications within the instance, or the like (e.g., through terminal 211 and network 209). The permissions may be implemented using credentials (such as a password, a personal identification number (PIN), or the like), keys (such as a private key, a secret key, or the like), or the like.

Figure 3:
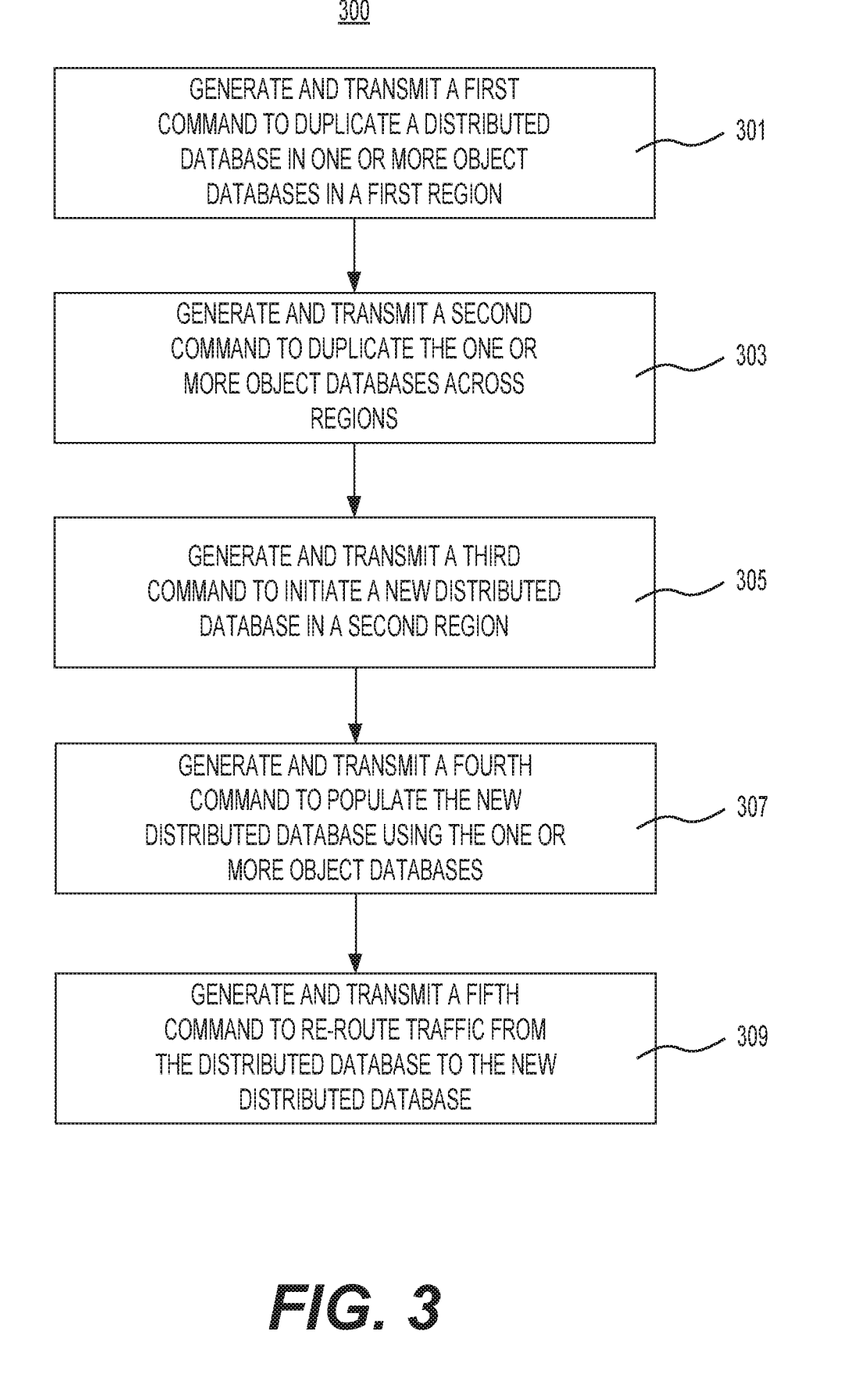
FIG. 3 is a flowchart of an example method for backing up a distributed database, according to an example embodiment of the present disclosure.

FIG. 3 depicts an example method 300 for backing up a distributed database. The distributed database may be stored across a plurality of servers within a first geographic region (e.g., zone 201 or zone 207 of cloud service 200 of FIG. 2). Method 300 may be implemented using one or more processors (e.g., processor 501 of FIG. 5). As explained above, any of the commands of method 300 may comprise application programming interface (API) calls.

At step 301, the processor may generate and transmit a first command to duplicate the distributed database in one or more object databases on the servers in the first geographic region. For example, the distributed database may comprise a database instance on the cloud service, such as database instances 203a, 203b, 203c, 203d, 209a, 209b, 209c, or 209d of FIG. 2, described above. Moreover, the object databases may comprise object stores on the cloud service, such as stores 205a, 205b, 205c, 205d, 211a, 211b, 211c, and/or 211d of FIG. 2, described above.

At step 303, the processor may generate and transmit a second command to duplicate the one or more object databases on a plurality of servers in at least a second geographic region. In some embodiments, the plurality of servers in the second geographic region may be independent from the plurality of servers in the first geographic region. For example, the remote servers in the first geographic region may provide distributed databases and object stores that are spatially and logically separate from distributed databases and object stores in the second geographic region, e.g., as depicted in zones 201 and 207 of FIG. 2, described above.

At step 305, the processor may generate and transmit a third command to initiate a new distributed database on the plurality of servers in the second geographic region. For example, the new distributed database may comprise a database instance on the cloud service, such as database instances 203a, 203b, 203c, 203d, 209a, 209b, 209c, or 209d of FIG. 2, described above. In such an example, if the original distributed database were in zone 201, the new distributed database may be in zone 207, and vice versa. Step 305 may be executed when an error is detected with at least one server within the first geographic region, as explained above.

At step 307, the processor may generate and transmit a fourth command to populate the new distributed database using the one or more object databases on the plurality of servers in the second geographic region. For example, the servers may use a mapping, as described above, to transfer unstructured data in the one or more object databases to a new structured database (the new distributed database) corresponding to the structure of the original distributed database.

At step 309, the processor may generate and transmit a fifth command to re-route traffic from the distributed database to the new distributed database. For example, as explained above, the fifth command may modify a weighted routing policy such that traffic to the database instance is directed to the new database instance.

Steps 305, 307, and 309 may be implemented by execution of a script generated for executing upon a detected error associated with the distributed database. For example, the processor may generate the script and transmit the script to at least one of the servers in the first geographic region and the servers in the second geographic region. The script may cause servers in the second region to initiate a new distributed database on the plurality of servers in the second geographic region, populate the new distributed database using the one or more object databases on the plurality of servers in the second geographic region, and re-route traffic from the distributed database to the new distributed database.

Figure 4:
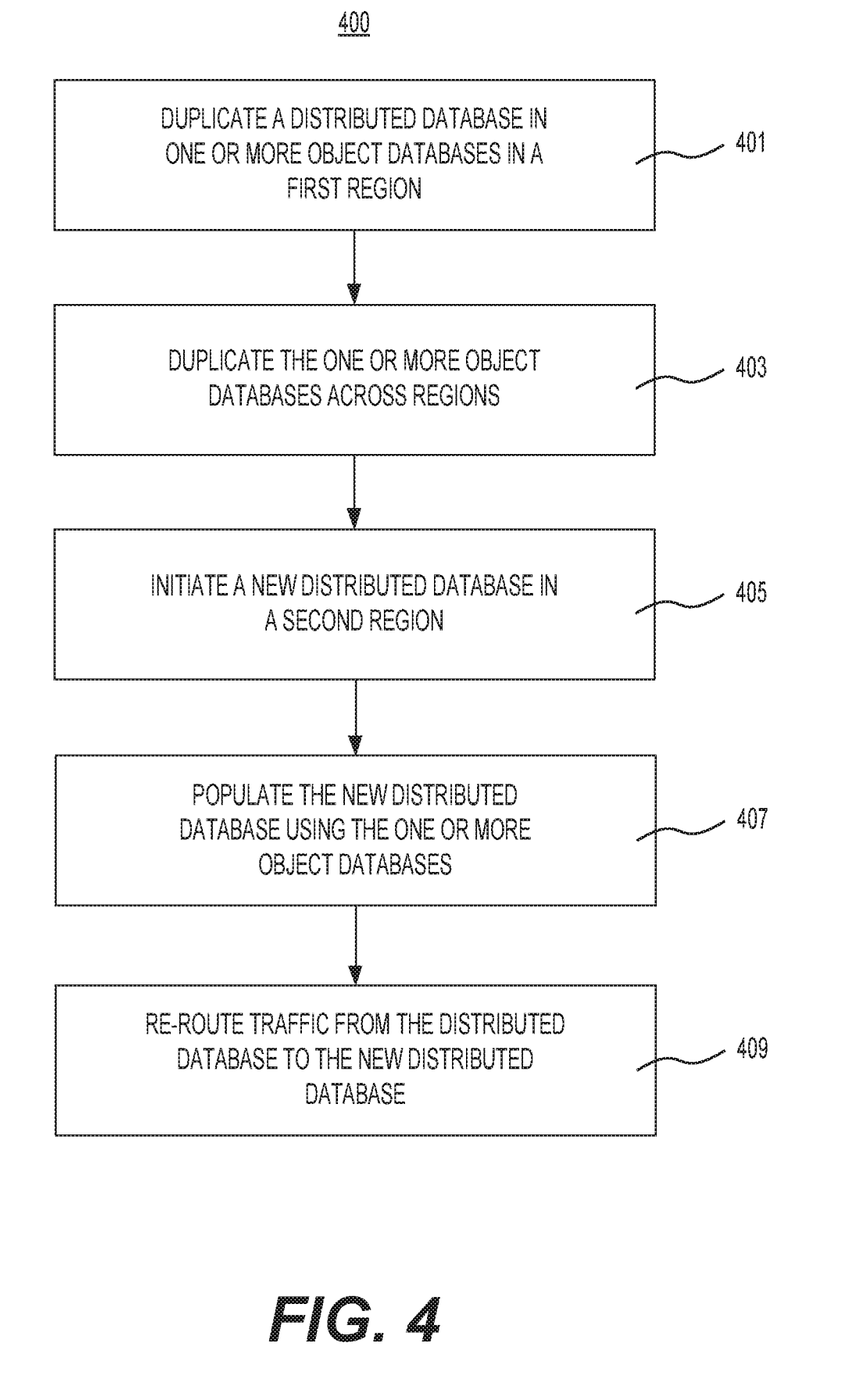
FIG. 4 is a flowchart of an example method for hosting a distributed database and backing up the same, according to an example embodiment of the present disclosure.

FIG. 4 depicts an example method 400 for hosting a distributed database and backing up the same. The distributed database may be stored across a plurality of servers within a first geographic region (e.g., zone 201 or zone 207 of cloud service 200 of FIG. 2). Method 400 may be implemented using one or more processors (e.g., processor 501 of FIG. 5). Method 400 may represent a method performed by one or more remote services providing a cloud service and may thus correspond to steps performed by a (user) terminal in accordance with method 300 described above. Accordingly, one or more steps of method 400 may be performed in response to commands generated and transmitted in accordance with method 300.

At step 401, the cloud service may duplicate the distributed database in one or more object databases on the servers in the first geographic region. For example, the cloud service may duplicate the distributed database in response to a command received from a terminal (e.g., as described above with respect to step 301).

As explained above, the distributed database may comprise a database instance on the cloud service, such as database instances 203a, 203b, 203c, 203d, 209a, 209b, 209c, or 209d of FIG. 2, described above. Moreover, the object databases may comprise object stores on the cloud service, such as stores 205a, 205b, 205c, 205d, 211a, 211b, 211c, and/or 211d of FIG. 2, described above.

At step 403, the cloud service may duplicate the one or more object databases on a plurality of servers in at least a second geographic region. For example, the cloud service may duplicate the one or more object databases in response to a command received from a terminal (e.g., as described above with respect to step 303).

In some embodiments, the plurality of servers in the second geographic region may be independent from the plurality of servers in the first geographic region. For example, the remote servers in the first geographic region may provide distributed databases and object stores that are spatially and logically separate from distributed databases and object stores in the second geographic region, e.g., as depicted in zones 201 and 207 of FIG. 2, described above.

At step 405, the cloud service may initiate a new distributed database on the plurality of servers in the second geographic region. The cloud service may initiate the new distributed database in response to a command received from a terminal (e.g., as described above with respect to step 305).

For example, the new distributed database may comprise a database instance on the cloud service, such as database instances 203a, 203b, 203c, 203d, 209a, 209b, 209c, or 209d of FIG. 2, described above. In such an example, if the original distributed database were in zone 201, the new distributed database may be in zone 207, and vice versa. Step 305 may be executed when an error is detected with at least one server within the first geographic region, as explained above.

At step 407, the cloud service may populate the new distributed database using the one or more object databases on the plurality of servers in the second geographic region. For example, the cloud service may populate the new distributed database in response to a command received from a terminal (e.g., as described above with respect to step 307). As explained above, the cloud service may use a mapping, as described above, to transfer unstructured data in the one or more object databases to a new structured database (the new distributed database) corresponding to the structure of the original distributed database.

At step 409, the cloud service may re-route traffic from the distributed database to the new distributed database. For example, the cloud service may re-route traffic in response to a command received from a terminal (e.g., as described above with respect to step 309). As explained above, the cloud service may modify a weighted routing policy such that traffic to the database instance is directed to the new database instance.

Steps 405, 407, and 409 may be implemented by execution of a script generated for executing upon a detected error associated with the distributed database. For example, the cloud service may generate the script and/or receive the script (e.g., from a terminal). The script may cause servers in the second region to initiate a new distributed database on the plurality of servers in the second geographic region, populate the new distributed database using the one or more object databases on the plurality of servers in the second geographic region, and re-route traffic from the distributed database to the new distributed database.

Figure 5:
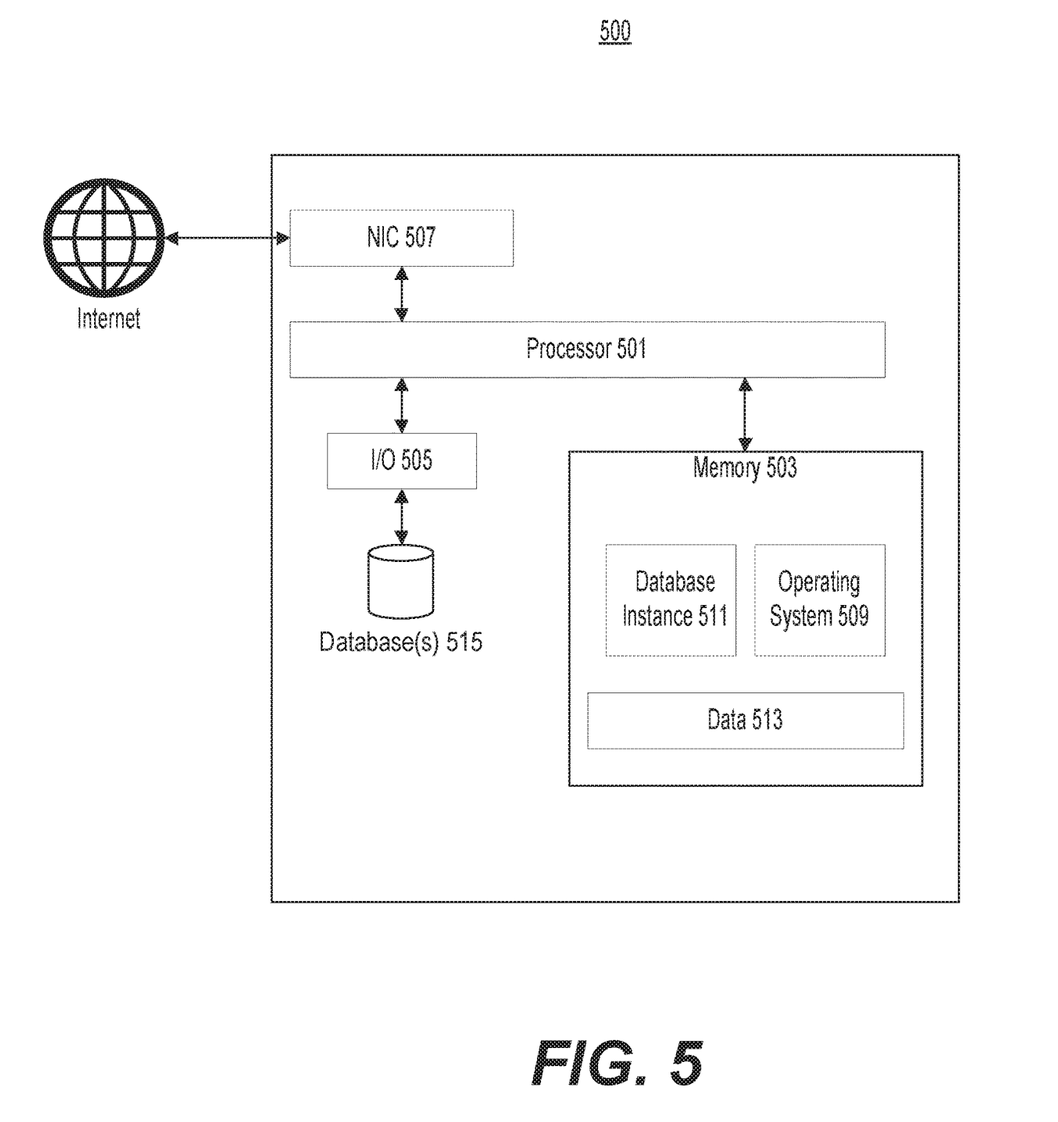
FIG. 5 is a block diagram of an example server with which the systems, methods, and apparatuses of the present disclosure may be implemented.

FIG. 5 is block diagram of an example device 500 suitable for implementing the disclosed systems and methods. For example, device 500 may comprise a server that executes method 400 of FIG. 4.

As depicted in FIG. 5, server 500 may have a processor 501. Processor 501 may comprise a single processor or a plurality of processors. For example, processor 501 may comprise a CPU, a GPU, a reconfigurable array (e.g., an FPGA or other ASIC), or the like.

Processor 501 may be in operable connection with a memory 503, an input/output module 505, and a network interface controller (NIC) 507. Memory 503 may comprise a single memory or a plurality of memories. In addition, memory 503 may comprise volatile memory, non-volatile memory, or a combination thereof. As depicted in FIG. 5, memory 503 may store one or more operating systems 509 and a database instance 511. For example, database instance 511 may comprise an instance of a distributed database such that server 500 functions as a node for the distributed database. Accordingly, processor 501 may execute all or part of method 400 of FIG. 4 to cross-regionally back up database instance 511. In addition, memory 503 may store data 513 produced by, associated with, or otherwise unrelated to operating system 509 and/or database instance 511.

Input/output module 505 may store and retrieve data from one or more databases 515. For example, database(s) 515 may include filesystem images for use in providing database instance 511.

NIC 507 may connect server 500 to one or more computer networks. In the example of FIG. 5, NIC 507 connects server 500 to the Internet. Server 500 may receive data and instructions over a network using NIC 507 and may transmit data and instructions over a network using NIC 507.

Each of the above identified instructions and applications may correspond to a set of instructions for performing one or more functions described above. These instructions need not be implemented as separate software programs, procedures, or modules. Disclosed memories may include additional instructions or fewer instructions. Furthermore, server 500 may receive commands from a user terminal executing method 300 of FIG. 3. Accordingly, server 500 may execute method 400 of FIG. 4. These functions of the user terminal and/or server 500 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system, comprising:
one or more memory devices storing one or more instructions; and
one or more processors configured to execute the one or more instructions to perform operations comprising:
generating one or more first object databases from a first distributed relational database comprising one or more tables, wherein the first distributed relational database has a first structured format, and the one or more first object databases comprise buckets storing unstructured data as objects;
before detecting that the first distributed relational database is no longer accessible, storing one or more second object databases on a plurality of servers, the one or more second object databases (i) being duplicates of the one or more first object databases and (ii) comprising the unstructured data; and
in response to detecting that the first distributed relational database is no longer accessible, transmitting, over one or more networks to the plurality of servers, a command to construct a second distributed relational database from the unstructured data of the one or more second object databases stored at the plurality of servers, the command transmitted to the plurality of servers to transfer the unstructured data of the one or more second object databases into the second distributed relational database in a second structured format of the second distributed relational database.

2. The system of claim 1, wherein the operations further comprise:
causing traffic directed to the first distributed relational database to be routed to the second distributed relational database in response to the unstructured data being transferred to the second distributed relational database.

3. The system of claim 2, wherein causing the traffic to be routed to the second distributed relational database comprises:
modifying a weighted routing policy such that a weight of zero is assigned as the weight in a first weighted routing scheme associated with the first distributed relational database.

4. The system of claim 1, wherein:
the first distributed relational database is stored on an additional plurality of servers located in a first geographic region;
the plurality of servers storing the one or more second object databases are located in a second geographic region;
the first geographic region differs from the second geographic region; and
the additional plurality of servers are independent from the plurality of servers.

5. The system of claim 1, wherein detecting that the first distributed relational database is no longer accessible comprises:
receiving an error message indicating that the first distributed relational database is no longer functional.

6. The system of claim 1, wherein the first structured format of the first distributed relational database is identical or similar to the second structured format of the second distributed relational database.

7. The system of claim 1, wherein the one or more first object databases comprise unstructured databases having an object-storage architecture including the buckets storing the unstructured data as the objects.

8. The system of claim 1, wherein the operations further comprise:
generating a script to cause a mapping to be identified and the unstructured data to be transferred from being stored in the one or more second object databases to being stored in the second distributed relational database.

9. The system of claim 1, wherein the one or more first object databases are the duplicates of an entire first distributed relational database.

10. A non-transitory computer readable medium storing instructions that, when executed by one or more processors, effectuate operations comprising:
generating one or more first object databases that are duplicates of a first distributed relational database comprising one or more tables, wherein the first distributed relational database has a first structured format, and the one or more first object databases comprise buckets storing unstructured data as objects;
before detecting that the first distributed relational database is not accessible, storing one or more second object databases on a plurality of servers, the one or more second object databases (i) being duplicates of the one or more first object databases and (ii) comprising the unstructured data; and
in response to detecting that the first distributed relational database is no longer accessible, transmitting, over one or more networks to the plurality of servers, a command to construct a second distributed relational database from the unstructured data of the one or more second object databases stored at the plurality of servers, the command transmitted to the plurality of servers to transfer the unstructured data of the one or more second object databases into the second distributed relational database in a second structured format of the second distributed relational database.

11. The non-transitory computer readable medium of claim 10, wherein the operations further comprise:
causing traffic directed to the first distributed relational database to be routed to the second distributed relational database in response to the unstructured data being transferred to the second distributed relational database.

12. The non-transitory computer readable medium of claim 11, wherein causing the traffic to be routed to the second distributed relational database comprises:
modifying a weighted routing policy such that a weight of zero is assigned as the weight in a first weighted routing scheme associated with the first distributed relational database.

13. The non-transitory computer readable medium of claim 10, wherein:
the first distributed relational database is stored on an additional plurality of servers located in a first geographic region;
the plurality of servers storing the one or more second object databases are located in a second geographic region;
the first geographic region differs from the second geographic region; and
the additional plurality of servers are independent from the plurality of servers.

14. The non-transitory computer readable medium of claim 10, wherein detecting that the first distributed relational database is no longer accessible comprises:
receiving an error message indicating that the first distributed relational database is no longer functional.

15. The non-transitory computer readable medium of claim 10, wherein the first structured format of the first distributed relational database is identical or similar to the second structured format of the second distributed relational database.

16. The non-transitory computer readable medium of claim 10, wherein the one or more first object databases comprise unstructured databases having an object-storage architecture including the buckets storing the unstructured data as the objects.

17. The non-transitory computer readable medium of claim 10, wherein the operations further comprise:
generating a script to cause a mapping to be identified and the unstructured data to be transferred from being stored in the one or more second object databases to being stored in the second distributed relational database.

18. The non-transitory computer readable medium of claim 10, wherein the one or more first object databases are the duplicates of an entire first distributed database.

* * * * *